(12) United States Patent
Wolf et al.

(10) Patent No.: US 7,950,418 B2
(45) Date of Patent: May 31, 2011

(54) DEVICE AND METHOD FOR REPAIRING A PIPELINE

(75) Inventors: Michael Wolf, Bremen (DE); Manfred Peschka, Aachen (DE)

(73) Assignee: Fraunhofer—Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 12/711,765

(22) Filed: Feb. 24, 2010

(65) Prior Publication Data

US 2010/0206417 A1    Aug. 19, 2010

Related U.S. Application Data

(63) Continuation of application No. PCT/EP2008/060642, filed on Aug. 13, 2008.

(30) Foreign Application Priority Data

Aug. 24, 2007 (DE) .......................... 10 2007 040 451

(51) Int. Cl.
*F16L 55/16* (2006.01)

(52) U.S. Cl. .............................. 138/99; 138/97; 138/157

(58) Field of Classification Search .................... 138/99, 138/170, 157, 97
See application file for complete search history.

(56) References Cited

U.S. PATENT DOCUMENTS

| | | | | |
|---|---|---|---|---|
| 4,424,264 A | * | 1/1984 | McGuire et al. | 429/179 |
| 4,533,419 A | * | 8/1985 | Pieslak et al. | 156/85 |
| 4,549,752 A |   | 10/1985 | Nimke et al. | 285/55 |
| 4,732,412 A | * | 3/1988 | van der Linden et al. | 285/47 |
| 5,123,451 A | * | 6/1992 | Savard | 138/99 |
| 5,137,591 A |   | 8/1992 | Gansbuehler et al. | 156/86 |
| 5,199,464 A | * | 4/1993 | Savard | 138/99 |
| 5,722,463 A | * | 3/1998 | Smyth et al. | 138/170 |
| 7,066,210 B2 | * | 6/2006 | Kakoschke et al. | 138/99 |
| 2004/0011415 A1 | * | 1/2004 | Kakoschke et al. | 138/99 |
| 2004/0115428 A1 | * | 6/2004 | Krolzig | 428/355 RA |

FOREIGN PATENT DOCUMENTS

| | | |
|---|---|---|
| EP | 0480686 A1 | 10/1991 |
| EP | 0561467 A1 | 9/1993 |
| GB | 2365094 A | 2/2002 |
| GB | 2396675 A | 6/2004 |

OTHER PUBLICATIONS

International Search Report and Written Opinion of the International Search Authority; PCT/EP2008/060642; Feb. 6, 2009; 7 pages.

* cited by examiner

*Primary Examiner* — Patrick F Brinson
(74) *Attorney, Agent, or Firm* — St. Onge Steward Johnston & Reens LLC

(57) ABSTRACT

A method for repairing a pipeline by means of at least one shell that is adapted to the outer contour of the pipeline, wherein the at least one shell is attached to the outer wall of the pipeline using an intermediate layer between the interior of the shell and the outer wall of the pipeline. The intermediate layer is made of an adhesive that can be activated, which is used to substantially completely coat the interior of the at least one shell. The attachment of the shell is carried out by applying a force acting at least in the radial direction, and the activation of the adhesive. A shell that is coated in this manner is also disclosed.

19 Claims, 3 Drawing Sheets

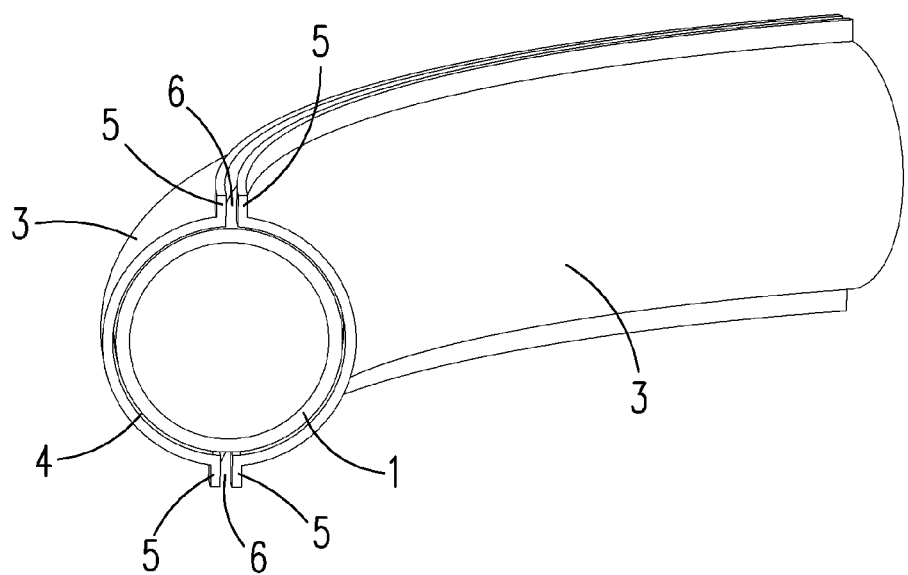
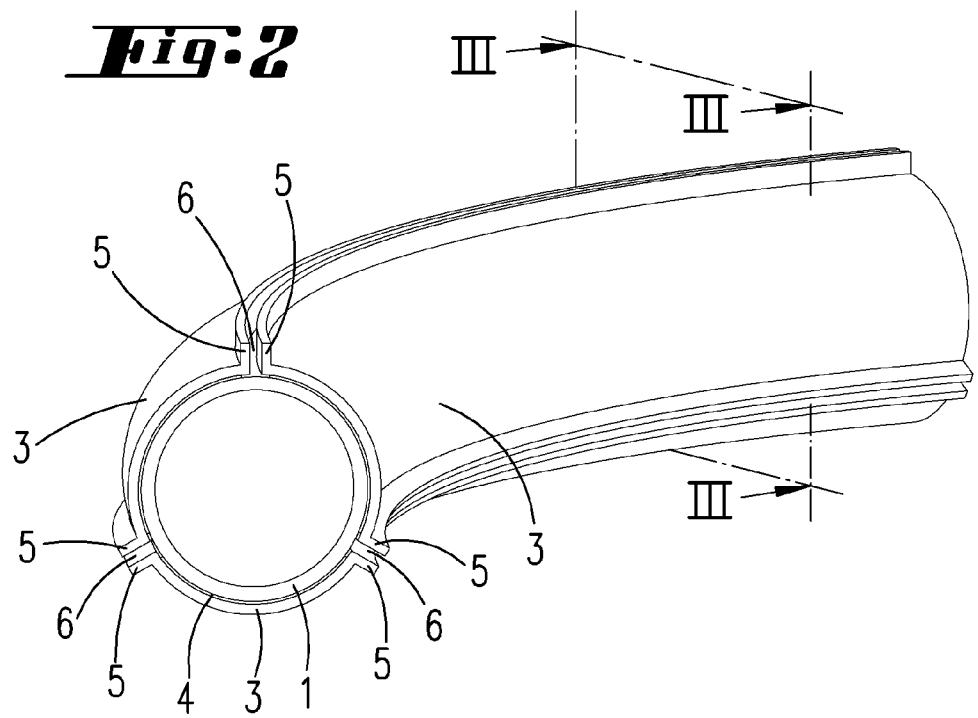

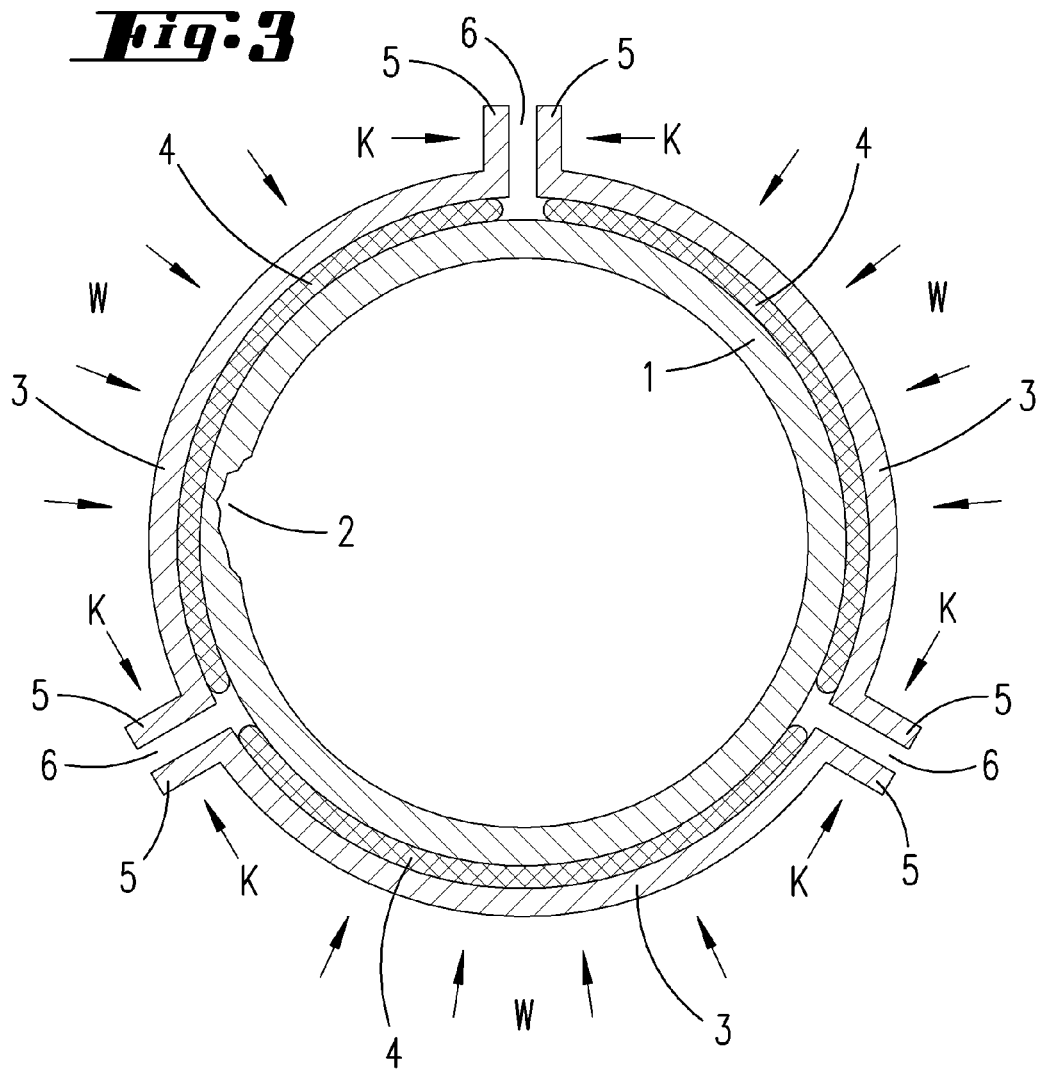
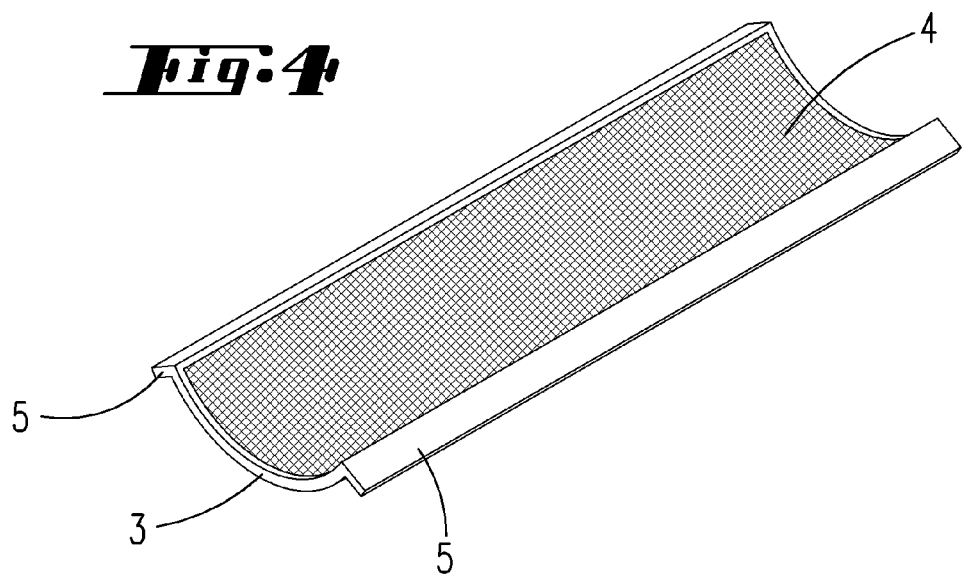

DEVICE AND METHOD FOR REPAIRING A PIPELINE

CROSS-REFERENCE TO RELATED APPLICATIONS

The present application is a continuation of pending International patent application PCT/EP2008/060642 filed on Aug. 13, 2008 which designates the United States and claims priority from German patent application number 10 2007 040 451.6 filed on Aug. 24, 2007, the content of which is incorporated herein by reference.

FIELD OF THE INVENTION

The invention relates to a method for repairing a pipe of a pipeline, and an apparatus for repairing a pipe of a pipeline.

BACKGROUND OF THE INVENTION

Pipelines consist of steel tubes having a diameter of 1 m or more. High-alloyed steels are used. Liquids, gases or even also emulsions flow through the pipes. Weak points may develop on the inner side of the pipe on account of corrosion, cavitation or the like. These weak points are located by regularly carried-out inspections. In order to repair pipe portions having weak points of this kind, a bypass of ca. 1,000 m length must be laid.

A method of the generic kind and an apparatus of the generic kind are described in EP 0 561 467 A1. According to this, two or more half shells are placed at a spacing around the pipe of the pipeline. A plastics material is then injected into the gap between the external wall of the pipe and the inner side of the shells.

A method is known from GB 23 96 675 for connecting two plastics pipes to each other by means of an electrically-welded sleeve. A sealing material can be injected between the inner wall of the sleeve and the outer wall of the pipes to be connected to one another.

EP 0 480 686 A1 describes a method for closing an opening in a pipeline with a ceramic plate, which closes the opening and is secured by means of a cement introduced into a casing.

SUMMARY OF THE INVENTION

It is an object of the invention to develop the generic method and the generic apparatus in such a way that the cost of repair is reduced.

This object is met by the invention specified in the claims. In principle, the object is also met by every claim independently. Each claim may be combined with any other claim.

First and foremost, there is proposed at least one shell which can be adhered to the outer wall of the pipe. Deviating from the above mentioned prior art, this shell does not have to be secured on the pipe with spacing means, since the intermediate layer is already physically present. All that is necessary is a force which acts at least in the radial direction and presses the coated shell against the outer wall of the pipe. For this, half shells or one-third shells may be used. The inner wall of these shells is precoated with an adhesive layer. The surface of the adhesive is dry. It has therefore no sticky properties. The pre-applied adhesive can however be activated thermally. It is essential for the half shells to be adapted to the peripheral shape of the pipe, so that the inner sides of the shells can be brought into face-to-face engagement on the pipeline pipe, these inner sides having been fully coated with an adhesive layer. If the pipe to be repaired is a linear portion, the various shells to be located about the pipe in the circumferential direction can be configured to each be the same. If the pipe to be repaired is an elbow, the shells are then configured differently, but are as a whole adapted to the shape of the elbow. The shells adapted in this way are placed side-by-side in the circumferential direction of the pipe, so that joints are provided running in the axial direction, i.e. the direction of extent of the pipe. A force is then applied to the shells which develops at least a force component acting in the radial direction. The adhesive layer is pressed against the outer wall of the pipe by this force component. The adhesive is thermally activated. This may be effected by a heating device which can be put in position on the pipe, by resistance heating, by induction, or even also by combustion. The adhesive is activated by the heating and enters into a bonding connection with the outer wall of the pipe. The adhesive hardens out during cooling. The adhesive then has an adherent force of typically 25 Mpa. The adhesive may be an epoxy resin. The thickness with which the adhesive is applied to the inner side of the shells may be between 0.1 and 10 mm. Preferably the layer thickness is about 1-3 mm. The adhesive is preferably applied as a liquid. It may be sprayed on, rolled on or extruded on. In its activated state, the highly viscous adhesive softens and can flow so as to even out irregularities in the surface. The force for the flow of the adhesive is delivered by the applied force that develops at least a radial component. Preferably, the shells have flange projections at their adjacently located edges. Clamping devices can engage on these flange projections and apply a circumferential force to the shells. The shells are at a small spacing from one another, so that adhesive can well out between the edges of the shells. This serves inter alia for quality assurance for the adhesive bond. In the simplest case, the repair kit consists of only one shell, which is coated with adhesive on its inner side, the adhesive coating being effected during manufacture of the shell or however also only on site. This shell is secured on the pipe by means of a holding device. It functions in a manner similar to a patch and is held by the holding device. The holding device may be a clamping device which encircles the pipe and the shell in the manner of a belt or a hose clamp. The required force may also be developed by this clamping device, in order for the adhesive to be pressed in the radial direction against the surface of the pipe. The shells thus form partial reinforcements, both in the case of straight pipe portions and also for curved pipe portions. The holding devices can be taken away again after the adhesive has hardened out. They may however also remain as additional mechanical backup.

BRIEF DESCRIPTION OF THE DRAWINGS

Embodiments of the invention are explained below with reference to accompanying drawings, in which:

FIG. 1 shows a perspective illustration of a pipe to be repaired, with shells in the shape of an elbow applied, FIG. 2 shows a modification, in which three shells are provided instead of two shells, FIG. 3 shows a section on the line III-III in FIG. 2, FIG. 4 shows, in perspective illustration, a shell for use on a straight pipe.

DETAILED DESCRIPTION OF THE INVENTION

Figure 5:
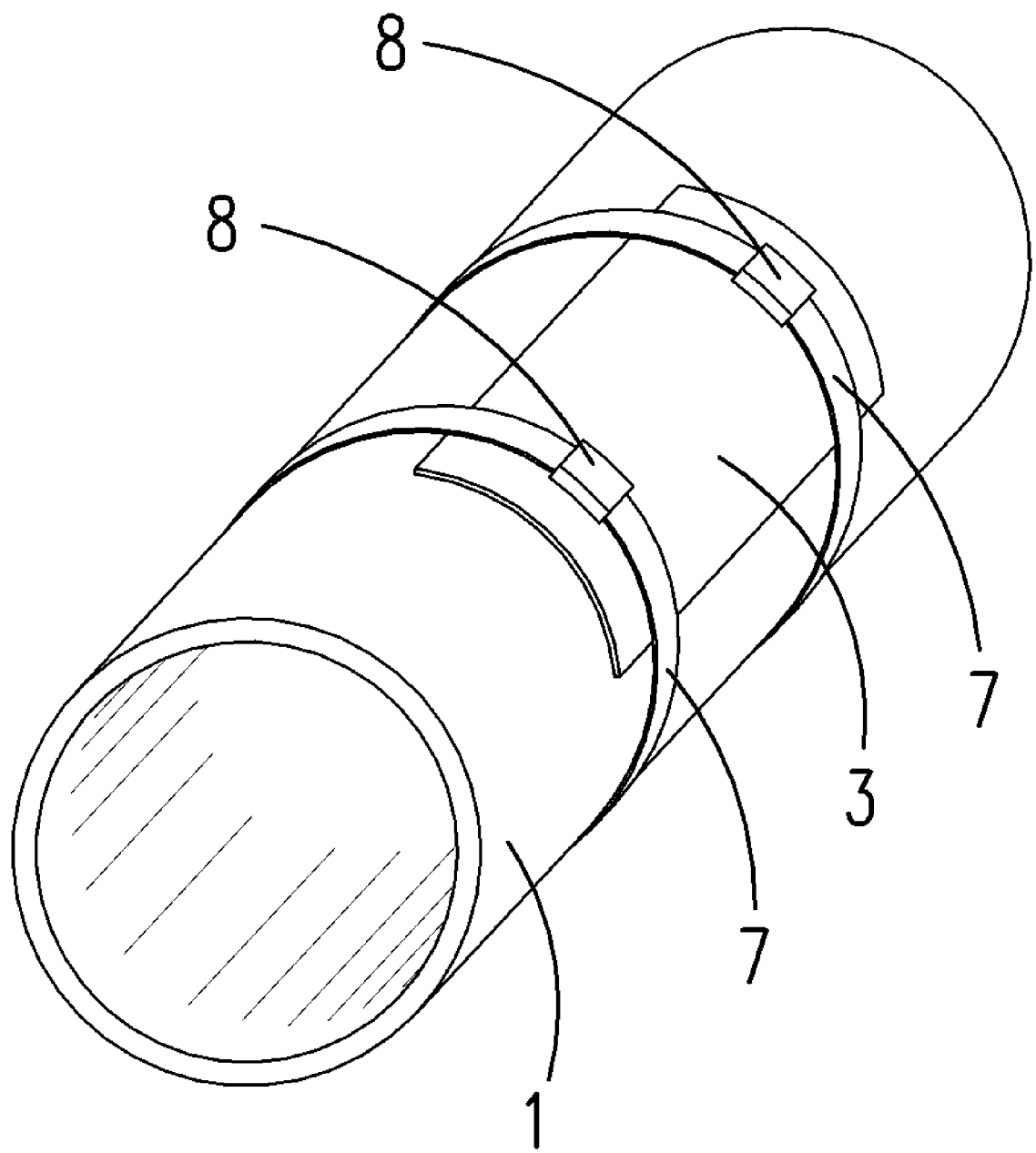
FIG. 5 shows a further modification, in which only one shell is used.

A pipe 1 of a pipeline consists of high-alloyed steel and may have a weak point 2 on the inside of the pipe as a result of corrosion or cavitation. A weak point 2 of this kind may be found on a pipeline 1 by an inspection. In order to avoid a leak developing in the case of this weak point 2 becoming larger, the pipe 1, which may be a straight-line pipe or an elbow, is provided with a shell 3, which covers over the weak point 2. In principle, one shell 3 suffices, which can be secured by means of a suitable holding device that engages around the pipe in the manner of a belt. The holding device may at the same time be a tensioning device in order to apply a radial force. An adhesive layer 4 provided on the shell 3 on its inner side is pressed against the outer wall of the pipe by this radial force.

A plurality of shells is preferably provided, half-shells in the case of the embodiment according to FIG. 1 and one-third shells in the case of the embodiment according to FIG. 2. The shells 3 consist of steel and are coated with an adhesive layer 4 on their inner side, i.e. their concave side. The adhesive is an epoxy adhesive, which is dry, i.e. non-sticky. The epoxy adhesive is activatable at 80° C.-120° C. and then develops its full adhesive capacity.

Application of the adhesive 4 to the concave side of the shell 3 is effected in liquid form, by spraying, extrusion or the like.

The half shells have previously been manufactured to have an internal wall contour that corresponds to the external wall contour of the pipe to be repaired.

The individual shells 3 are placed around the pipe in such a way that their edges run parallel to the elongate contour of the pipe. Flange portions 5 extend outward in the radial direction at the edges. These flange portions are flange strips that are spaced apart from one another, so that a gap 6 is formed between the individual shells 3.

The shells with their adhesive layer 4 are in surface engagement against the previously prepared external wall of the pipe 1 to be repaired. The pipes are pretreated, for example by sandblasting, acid treatment, or the like, in such a way that as soon as the adhesive is activated, it establishes an adhesive bond with the external wall of the pipe. For this, coatings which are possibly present on the external wall of the pipe are fully removed, so that the adhesive may enter into an effective bond with the bare metal.

In FIG. 3, the force action of a clamping force to be applied is represented by K. The force K is applied in the circumferential direction so that the two flange edges 5 that run parallel to one another are pressed against each other. As a result of this, a radially inwardly directed force component is developed in the region of the adhesive layer 4, this force pressing the adhesive layer 4 onto the surface of the pipe 1 to be repaired.

A heating action is designated by W, this being developed by means of a heating device. The heating device warms up the shells 3 mounted on the pipe 1 to be repaired, so that the thermally activatable adhesive 4 is softened. As a result of the force K applied during the application of heat, the softened adhesive 4 penetrates to some extent into the gap interspaces 6. The application of the heat is terminated when a sufficient quantity of adhesive is present in the gap interspaces 6. After the adhesive 4 has cooled down and hardened out, the continuing force action K may be terminated. For permanent securing of the shells 3 to one another, the shells may be bolted to one another in the region of the flanges 5.

The clamping force may be applied by a clamp, hydraulically, by way of a tensioned spring, or otherwise. It is necessary for the clamping force to have sufficient resilience for the shells 3 to be able to shift slightly in the course of the activation of the adhesive layer 4.

Enlargement of the weak point 2 and its final development into a hole in the pipe 1 is not in fact prevented by the apparatus described above or by the method described above. Discharge of fluid from the pipe 1 is however prevented in an effect manner, since the shell 3 functions as a new pipe wall. In order to ensure this, the shells 3 are arranged around the pipe 1 in such a way that the weak point 2 is located approximately midway between two edges 5 of a shell 3, thus the shell 3 overlies the weak point in an optimal manner.

FIG. 5 shows a modification in which only one shell 3 is to be adhered to a weak point 2 that is not to be seen in this figure. Here also, the external wall of the pipe has been pretreated. A coating has been removed by sand blasting or by a suitable acid treatment, so that the adhesive of the shell enters into direct contact with the steel of the pipe. Clamping means engaging around the pipe are designated by the reference numeral 7 and may be clamping belts. Reference numeral 8 designates schematically illustrated clamping members, by means of which tension can be exerted on the clamping belts 7.

The shells may be precoated with adhesive. They may however also be coated with adhesive only on site. This is especially advantageous if the adhesive is a liquid or pasty medium. An adhesive which can be pre-applied is especially suitable, so that the repair can be effected without having to bother with liquid adhesives on site. The adhesives are preferably applied to the inner side of the shell 3 during its manufacture. The adhesives have a dry or self-adhering surface at ambient temperature. After the shell 3 or the plurality of shells 3 is/are secured on the pipe, the adhesive is thermally activated, the bond to the pipe being first of all effected and a chemical cross-linking reaction bringing about a duromer adhesive, i.e. an adhesive that is non-soluble and non-meltable. The main constituent of the organic portion of the adhesive which can be pre-applied consists of acrylate, methacrylate, polyurethane, phenol resin or epoxy resin in monomeric, oligomeric or polymeric form. Preferred embodiments of adhesives which can be pre-applied are described in more detail below:

Reactive adhesives which can be pre-applied and are stickily adhesive are preferably covered by a protective film or protective paper after being applied to the inner side of the shell 3, as is generally customary according to the state of the art, e.g. for self-adhesive labels. The purpose of the protective film or protective paper is to protect the sticky adhesive from contamination. The advantage of this embodiment of the invention is that the repairing shell 3 adheres on the pipe immediately after it has been applied and does not have to be held further for the remaining process steps. The strength and durability of conventional sticky adhesives is however in no way sufficient under the typical conditions of use for a pipeline, so that a cross-linking to form a duromer adhesive with permanent bonding must be effected. The sticky adhesives—preferably based on acrylates, polychloroprene or polyisoprene—must as a result contain chemical groups, which are subsequently amenable to a cross-linking reaction under site conditions. Examples of these are:

acrylate groups (bonded to the base polymers or in the form of low-molecular acrylates), which are cross-linked by micro-encapsulated peroxides, the peroxides being released from the microcapsules by thermal action or by mechanical pressure;

copolyacrylates containing stickily adhesive acrylates (e.g. isooctylacrylate) and acrylates containing hydroxyl groups (e.g. 2-hydroxyethylacrylate or 2-hydroxymethacrylate), which are cross-linked by thermally activatable blocked isocyanates (e.g. Desmodur TT, Rheinchemie).

For the embodiments of the invention which are based on adhesives that can be pre-applied and have a dry surface, covering-over of the adhesive is normally not necessary, but may be used to used to protect the adhesive layer from contamination. Adhesives of this kind may have a different base. Examples are mentioned below:

solid polyesterpolyols (e.g. polycaprolactone (e.g. CAPA from Solvay) or polyhexanedioladipates (e.g. Dynacoll from Degussa)), which are formulated with thermally activatable blocked isocyanates (e.g. Desmodur TT, Rheinchemie). Application to the substrate to be precoated is effected in the form of a melt.

solid epoxidated phenol resins (e.g. Novolak epoxy resin, EPR 600 from Hexion), which are formulated with dicyanodiamide (e.g. Dyhard 100 from Degussa) and optionally urones (e.g. UR 300 from Degussa) as hardening accelerator. Application to the substrate to be precoated is effected in the form of a melt.

aqueous dispersions of a solid bisphenol A or epoxy resin based on epoxidated Novolak (e.g. EPI-REZ Resin 3522-W-60 from Hexion), which is formulated with dicyanodiamide (e.g. Dyhard 100 from Degussa) and optionally a urone as hardening accelerator (e.g. UR 500 from Degussa). Application to the substrate to be precoated is effected e.g. by spraying-on of the aqueous dispersion. After evaporation of the water, a dry adhesive layer is achieved, which becomes sticky under heat and hardens out as an adhesive of high strength.

The cross-linking reaction is induced thermally after the components have been joined together. Preferred embodiments for introducing heat into the adhesive layer on site are hot air, electrically heated heating strips or heating cushions, and inductive heating of the metallic substrate material (e.g. the steel of which the pipe and/or the pipeline consists). These methods of heating are known in principle in the prior art and require merely to be adapted to the present invention.

The following experiment was carried out under laboratory conditions:

An adhesive which can be pre-applied as a dry reactive layer is prepared from 900 g polycaprolactonediol with a molecular weight of 2000 (PCL 2000 E diol, Solvay) and 100 g polycaprolactonetriol with a molecular weight of 2000 (PCL 2000 E triol, Solvay) and 91.5 g IsoQurc TT (Isochem Kautschuk GmbH), the powders being mixed closely into one another. At 70° C., a melt of the adhesive with an average thickness of 300 µm is applied to a half shell of steel St 37 having an internal diameter of 30 mm, a length of 50 mm and a material thickness of 1.2 mm. After cooling, the coating is non-sticky. A hole of 3 mm diameter is drilled in a pipe of St 37, the pipe having a length of 200 mm, an outer diameter of 30 mm and a wall thickness of 2 mm, and the hole is then to be repaired with the half shell precoated with the adhesive. For this, the half shell is placed on the pipe so that the hole is in the middle of the region covered by the half shell. The half shell and the pipe are firmly connected to one another by wire and the adhesive is then hardened for 60 min at 160° C. in an oven. After a storage time of 2 days under ambient conditions, the repaired pipe was subjected to a pressure test at 10 bar. There was no failure of the repaired location, either at 22° C. ambient temperature or at 50° C.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

What is claimed is:

1. Method for repairing a steel pipe of a pipeline by means of at least one shell made of steel and adapted to the external shape of the pipe, the at least one shell being secured to the external wall of the pipe by an intermediate layer between the inner side of the shell and the external wall of the pipe, wherein the intermediate layer is an adhesive, the inner side of the at least one shell is substantially completely coated with the adhesive, and the securing of the shell is effected by application of a force that acts at least in the radial direction and by applying heat to the adhesive, characterized by the steps of:
   selecting an adhesive that is applicable as a liquid or a pasty medium, has a dry or self-adhering surface at ambient temperature after being applied, softens by applying heat and cross-links to form a duromer on thermal activation;
   coating said inner side with said liquid or pasty medium;
   drying the coating;
   securing said coated shell at the external wall of the pipe;
   softening the coating by applying heat; and
   thermally activating the adhesive to form a duromer.

2. Method according to claim 1, wherein a plurality of shells that are adapted to the peripheral shape of the pipe is arranged to lie side by side in the circumferential direction of the pipe, a gap interspace remaining between the shells.

3. Method according to claim 1, wherein the adhesive layer has a thickness of 0.1-10 mm.

4. Method according to claim 1, wherein a heating device is used for the thermal activation, the device being able to heat the shells up to the activation temperature of the adhesive, which is in particular 80.degree. C.-120.degree. C.

5. Method according to claim 1, wherein the external wall of the pipe is pretreated by sand blasting, acid treatment, or the like.

6. Method according to claim 1, wherein the force is applied by one or more clamping devices.

7. Method according to claim 1, wherein the clamping force is applied for sufficient time for the adhesive to flow into the gap between adjacently located shells.

8. Apparatus for repairing a steel pipe of a pipeline with at least one shell made of steel and adapted to the peripheral shape of the pipe, wherein the inner side(s) of the shell(s) is/are in each case substantially completely coated with an adhesive, characterized in that the adhesive has a dry or self-adhering surface at ambient temperature, softens by applying temperature and cross-links to form a duromer on thermal activation.

9. Apparatus according to claim 8, wherein the shells are spaced apart from one another in the mounted condition by a gap.

10. Apparatus according to claim 8, wherein the edges of the shells that are located side by side and extend, in the mounted condition, substantially in the axial direction of the pipe, have radially projecting flange portions for application of circumferential force.

11. Apparatus according to claim 8, wherein the adhesive is an activatable resin.

12. Apparatus according to claim 8, wherein the thickness of the material of the adhesive layer is 0.1-10 mm.

13. Apparatus according to claim 8, wherein an adhesive is applied in liquid form and forms a dry and non-sticky layer.

14. Apparatus according to claim 8, wherein shells adapted to a straightline pipe or to an elbow.

15. Apparatus according to claim 8, wherein an activation temperature of the adhesive is 80.degree. C.-120.degree. C.

16. Method according to claim 3, wherein the adhesive layer has a thickness of 1-3 mm and is applied as a liquid.

17. Method according to claim 6 wherein the clamping devices are resilient and formed to engage around the pipe.

18. Apparatus according to claim 12 wherein the thickness of the adhesive layer is 1-3 mm.

19. Apparatus according to claim 8, wherein there are at least two shells.

* * * * *